United States Patent
Koga (10) Patent No.: US 9,674,359 B2
(45) Date of Patent: Jun. 6, 2017

(54) CALL CENTER TELEPHONE SYSTEM, PRIVACY CALL METHOD, AND NON-TRANSITORY COMPUTER READABLE MEDIUM STORING PRIVACY CALL PROGRAM

(71) Applicant: NEC Platforms, Ltd., Kawasaki-shi, Kanagawa (JP)

(72) Inventor: Satomi Koga, Kanagawa (JP)

(73) Assignee: NEC Platforms, Ltd., Kawasaki-shi, Kanagawa (JP)

(*) Notice: Subject to any disclaimer, the term of this patent is extended or adjusted under 35 U.S.C. 154(b) by 0 days.

(21) Appl. No.: 15/306,637

(22) PCT Filed: Apr. 9, 2015

(86) PCT No.: PCT/JP2015/002000
§ 371 (c)(1),
(2) Date: Oct. 25, 2016

(87) PCT Pub. No.: WO2015/166633
PCT Pub. Date: Nov. 5, 2015

(65) Prior Publication Data
US 2017/0078486 A1 Mar. 16, 2017

(30) Foreign Application Priority Data
Apr. 28, 2014 (JP) .................. 2014-092475

(51) Int. Cl.
*H04M 3/00* (2006.01)
*H04M 3/51* (2006.01)
(Continued)

(52) U.S. Cl.
CPC ..... *H04M 3/5175* (2013.01); *H04M 3/42314* (2013.01); *H04M 3/5133* (2013.01); *H04M 3/56* (2013.01)

(58) Field of Classification Search
CPC .............. H04M 3/5175; H04M 3/523; H04M 2203/401; H04M 3/42221; H04M 3/51; H04M 3/436
(Continued)

(56) References Cited

U.S. PATENT DOCUMENTS

2004/0062363 A1* 4/2004 Shambaugh ............ H04M 3/51
379/88.01

FOREIGN PATENT DOCUMENTS

JP 2001-268242 A 9/2001
JP 2004-252668 A 9/2004
(Continued)

OTHER PUBLICATIONS

Decision to Grant a Patent for Japanese Patent Application No. 2014-092475, dated Jul. 26, 2016.
(Continued)

*Primary Examiner* — Rasha Al Aubaidi
(74) *Attorney, Agent, or Firm* — Sughrue Mion, PLLC (57) ABSTRACT

When a two-way call connection state, which is between a customer terminal connected to an outside line-side of a private branch exchange and an operator terminal, is switched to a three-way call connection state, which is among the outside line, the operator terminal, and a supervisor terminal, using conference, in order to send advice or the like to an operator from a supervisor, a transmission line of the outside line, a first transmission line of the operator terminal, a reception line of the operator terminal, a transmission line and a reception line of the supervisor terminal are connected to one of the conference trunks, which has been captured from among the available conference trunks, and a second transmission line of the operator terminal is connected to a reception line of the outside line.

5 Claims, 4 Drawing Sheets

(51) Int. Cl.
*H04M 3/42* (2006.01)
*H04M 3/56* (2006.01)

(58) Field of Classification Search
USPC ............ 379/202.01, 206.02, 265.06–265.07
See application file for complete search history.

(56) References Cited

FOREIGN PATENT DOCUMENTS

| | | |
|---|---|---|
| JP | 2005-94569 A | 4/2005 |
| JP | 2010-141804 A | 6/2010 |
| JP | 2012-19416 A | 1/2012 |
| JP | 2013-145953 A | 7/2013 |
| WO | 00/33531 A2 | 6/2000 |

OTHER PUBLICATIONS

Notification of Reasons for Refusal for Japanese Patent Application No. 2014-092475, dated Jun. 23, 2015.
Notification of Reasons for Refusal for Japanese Patent Application No. 2014-092475, dated Jan. 12, 2016.
International Search Report of PCT/JP2015/002000, dated Jun. 30, 2015. [PCT/ISA/210].

* cited by examiner

CALL CENTER TELEPHONE SYSTEM, PRIVACY CALL METHOD, AND NON-TRANSITORY COMPUTER READABLE MEDIUM STORING PRIVACY CALL PROGRAM

CROSS REFERENCE TO RELATED APPLICATIONS

This application is a National Stage of International Application No. PCT/JP2015/002000 filed Apr. 9, 2015, claiming priority based on Japanese Patent Application No. 2014-092475, filed Apr. 28, 2014, the contents of all of which are incorporated herein by reference in their entirety.

TECHNICAL FIELD

The present invention relates to a call center telephone system, a privacy call method, and a non-transitory computer readable medium storing a privacy call program.

BACKGROUND ART

Generally, in a call center telephone system, there are often cases in which operators alone cannot handle inquiries from customers and thus seek their supervisor's directions. However, in a conventional call center telephone system, as described in Patent Literature 1, "IP CALL CENTER SYSTEM, APPARATUS, AND PROGRAM FOR THE SAME" of Japanese Unexamined Patent Application Publication No. 2005-094569, when a supervisor monitors the content of a call between a customer and an operator, although the supervisor can understand the state of how the operator is dealing with the customer, the supervisor is unable to send advice or a message to the operator who is on the phone with the customer.

Moreover, as described in Patent Literature 2, "CONTACT CENTER MANAGING AND CONTROLLING PROGRAM, DEVICE, AND METHOD" of Japanese Unexamined Patent Application Publication No. 2004-252668, when a supervisor interrupts a call between a customer and an operator, the supervisor can send advice or a message to the operator who is on the phone with the customer, but the customer who is on an outside line can also hear the content of the advice or message. Therefore, in order to achieve a state in which a telephone conversation is performed only between the supervisor and the operator when the supervisor sends advice or a message, the outside line to which the customer is connected needs to be put on hold, and thus the customer connected on the outside line is made to wait.

Patent Literature 1: Japanese Unexamined Patent Application Publication No. 2005-094569 (pp. 4-6)
Patent Literature 2: Japanese Unexamined Patent Application Publication No. 2004-252668 (pp. 5-7)

SUMMARY OF INVENTION

Technical Problem

As described above, the conventional call center telephone systems disclosed in Patent Literature 1 and 2 each include call monitoring function and three-way calling function as functions for supervisors. The supervisor can hear a call between a customer and an operator by the means of the call monitoring function and can interrupt a call between a customer and an operator and talk to the operator by the means of the three-way calling function.

However, when the supervisor interrupts a call, the supervisor is unable to talk to the operator without letting the customer hear the content of the conversation between the supervisor and the operator unless an outside line connected to the customer is put on hold.

That is, with the call monitoring function and the call interruption function for supervisors, which are a part of the call center telephone function, the supervisor can select to either of: monitor a two-way call between an outside line (a customer) and an operator terminal while the call between the customer and the operator is being continued and then send advice or a message to the operator after the call between the customer and the operator is ended; or to interrupt a call between the customer and the operator, set a three-way call connection state among a supervisor terminal, the outside line (the customer), and the operator terminal, and then send advice or a message to the operator. If the supervisor selects the latter, and the supervisor wishes to send advice or a message only to the operator terminal, the call with the outside line (the customer) needs to be put on hold first, and then a two-way call between the supervisor terminal and the operator terminal need to be made.

If the call with the outside line (the customer) is put on hold, the customer on the outside call is made to wait in silence or with a hold tone on, thereby possibly impairing the comfort of the customer. Therefore, there have been requests to enable a supervisor to check a state of how an operator is dealing with a customer using the call monitoring function and then to send advice or a message only to the operator even during a call with the customer without making the customer wait.

Purpose of the Present Invention

The present invention has been made in light of the above problem, and an object of the present invention is to provide a call center telephone system, a privacy call method, and a privacy call program that enable a supervisor to send a message or advice to an operator who is on the phone with a customer without putting a connection with the customer on hold, making the customer wait, and letting the customer hear the message or the advice.

Solution to Problem

In order to solve the above problem, a call center telephone system, a privacy call method, and a privacy call program according to the present invention incorporate the following characteristic configurations.

(1) A call center telephone system according to the present invention is
a call center telephone system that receives an inquiry from a customer at a customer terminal connected to an outside line of a private branch exchange to an operator at an operator terminal connected to an extension of the private branch exchange and includes:
a supervisor terminal configured to be connected to an extension of the private branch exchange and used by the supervisor in order to provide advice or an instruction to the operator;
at least a function configured to achieve a three-way call connection state among the customer terminal on the outside line side, the operator terminal, and the supervisor terminal using conference trunks inside the private branch exchange, in addition to a function configured to achieve a two-way call connection state between the customer terminal on the outside line side and the operator terminal; and the operator terminal comprising one reception line as a call line on a reception side and two call lines as call lines on a transmission side, the two call lines including a first transmission line and a second transmission line, wherein when the private branch exchange switches the two-way call connection state between the customer terminal on the outside line side and the operator terminal to the three-way call connection state using the conference trunks, the private branch exchange captures one of the available conference trunks and connects a transmission line of the outside line, i.e., a call line on a transmission side of the outside line, the reception line and the first transmission line of the operator terminal, a transmission line of the supervisor terminal, i.e., a call line on a transmission side of the supervisor terminal, and a reception line of the supervisor terminal, i.e., a call line on a reception side of the supervisor terminal, to the captured conference trunk, and also connects the second transmission line of the operator terminal to a reception line of the outside line, i.e., a call line on a reception side of the outside line.

(2) A privacy call method according to the present invention is a privacy call method for transmitting a voice output from a supervisor terminal connected to an extension of a private branch exchange to an operator terminal without letting the voice flow to an outside line in a call center telephone system receiving an inquiry from a customer at a customer terminal connected to the outside line of the private branch exchange to an operator at the operator terminal connected to an extension of the private branch exchange and includes:

when the private branch exchange sets a three-way call connection state among the customer terminal on the outside line side, the operator terminal, and the supervisor terminal using conference trunks included in the private branch exchange, capturing one of the available conference trunks, and setting a three-way call connection state, the three-way call connection state being a state in which a transmission line of the outside line, i.e., a call line on a transmission side of the outside line, a first transmission line of the operator terminal, the first transmission line being one of two call lines included as call lines on a transmission side of the operator terminal, a reception line of the operator terminal, i.e., a call line on a reception side of the operator terminal, a transmission line of the supervisor terminal, i.e., a call line on a transmission side of the supervisor terminal, and a reception line of the supervisor terminal, i.e., a call line on a reception side of the supervisor terminal are connected to the captured conference trunk, and a second transmission line of the operator terminal is connected to a reception line of the operator terminal, i.e., a call line on a reception side of the outside line, the second transmission line being one of the two call lines included as the call lines on the transmission side of the operator terminal.

(3) A privacy call program according to the present invention causes a computer to execute the privacy call method described in (2).

Advantageous Effects of Invention

According to the call center telephone system, the privacy call method, and the privacy call program of the present invention, the following advantages can be achieved.

Firstly, when an operator attempts to receive advice, a message, or an instruction from a supervisor, a transmission line of an outside line to which a customer terminal is connected, a reception line of an operator terminal, a first transmission line for an internal connection of the operator terminal, which is one of two transmission lines of the operator terminal, and a transmission line and a reception line of the supervisor terminal are connected to a conference trunk included in a private branch exchange. A reception line of the outside line is connected to a second transmission line for an outside line connection of the operator terminal, which is one of the two transmission lines of the operator terminal. Then, a three-way call connection state is established. In this way, the operator who is on the phone with the customer can receive the advice, the message, or the instruction from the supervisor without putting the outside line to which the customer terminal of the customer is connected on hold and without letting the customer hear the advice, the message, or the instruction from the supervisor.

Secondly, a switch for switching on and off a connection between the reception line of the outside line and the second transmission line of the operator terminal is further included in the second transmission line of the operator terminal. In the three-way call connection state, when the operator attempts to utter a voice to the supervisor, the operator switches off the switch in order to make the connection to the reception line of the outside line be in an opened state. Then, the operator who is on the phone with the customer can consult with the supervisor, utter any confirmation about the instruction or the message, make any inquiry, or the like to the supervisor without putting the outside line to which the customer terminal of the customer is connected on hold and without letting the customer hear the consultation, the confirmation, the inquiry, or the like.

DESCRIPTION OF EMBODIMENTS

Hereinafter, preferred embodiments of a call center telephone system, a privacy call method, and a privacy call program according to the present invention will be described with reference to the attached drawings. In the following descriptions, although the call center telephone system and the privacy call method according to the present invention will be described, it is obvious that the privacy call method may be carried out as a computer executable privacy call program or the privacy call program may be recorded on a computer readable recording medium. Further, the reference signs shown in the drawings are added to the components for convenience as an example for easier understanding. Additionally, it is obvious that the present invention is not limited to the illustration.

Features of the Present Invention

An outline of features of the present invention will be described prior to descriptions of the embodiments of the present invention. A main feature of the present invention is to switch a two-way call state, which is between an outside line (a customer) and an operator, to a three-way call state, which includes a privacy state that keeps a call private from the outside line (the customer) and in which the supervisor is included in the call, using conference trunks for three-way calls. Then, it enables the supervisor to send advice or a message to the operator who is on the phone with the customer on the outside line without putting the customer on the outside line who is on the phone with the operator on hold and without letting the customer on the outside line hear the advice and the message.

That is, in the call center telephone system according to the present invention, an operator terminal has a configuration in which two branched first and second transmission lines are connected to a mouthpiece (a microphone) as call lines for transmission, and one reception line is connected to an earpiece (a speaker or an earphone) as a call line for reception. When the two-way call state, which is a normal state, between the outside line (the customer) and the operator terminal is switched to the three-way call state including the supervisor, in the operator terminal, one of the branched transmission lines, namely, the first transmission line, connected to the mouthpiece (the microphone) is connected to the conference trunk for a three-way call, and the connection of the other one of the transmission line, namely, the second transmission line, to a reception line on the outside line side remains as it is or the second transmission line is connected to the reception line on the outside line side via a switch that is separately provided. Further, the reception line connected to the earpiece (the speaker or the earphone) is connected to the conference trunk for a three-way call.

The outside line includes a transmission line, i.e., a call line on a transmission side and the reception line, i.e., a call line on a reception side. This transmission line is connected to the conference trunk for a three-way call. On the other hand, the connection of this reception line to the operator terminal via the second transmission line on the operator terminal side remains as it is or this reception line is connected to the operator terminal via a switch that is separately provided in the second transmission line of the operator terminal side.

In regard to a supervisor terminal, both call lines on the reception and transmission sides are connected to the conference trunk for a three-way call.

As described above, the call center telephone system according to the present invention can switch from the two-way call state between the customer and the operator to the three-way call state, which includes the privacy function that keeps a call private from the outside line (the customer) and in which the supervisor is included in the call, using the conference trunk. When a call path that is used to switch the state to the three-way call state is formed, both the transmission and reception lines of the supervisor terminal used by the supervisor are connected to the conference trunks. The transmission line of the outside line connected to a customer terminal on the customer side is connected to the conference trunk, while the reception line of the outside line is not connected to the conference trunk but instead connected to the second transmission line of the operator terminal. Alternatively, the switch may be included in the second transmission line of the operator terminal side to switch on and off the connection between the reception line of the outside line and the second transmission line on the operator terminal side in order to connect or disconnect the connection between the second transmission line on the operator terminal side and the reception line of the outside line.

In this way, the supervisor at the supervisor terminal having the reception and transmission lines connected to the conference trunks can talk to the operator, send advice, a message, or an instruction, and receive a consultation from the operator while the supervisor monitors the call between the customer and the operator without putting the outside line (the customer) on hold and without letting the customer hear the content of the call between the supervisor and the operator.

Configuration Example of Embodiment

Figure 1:
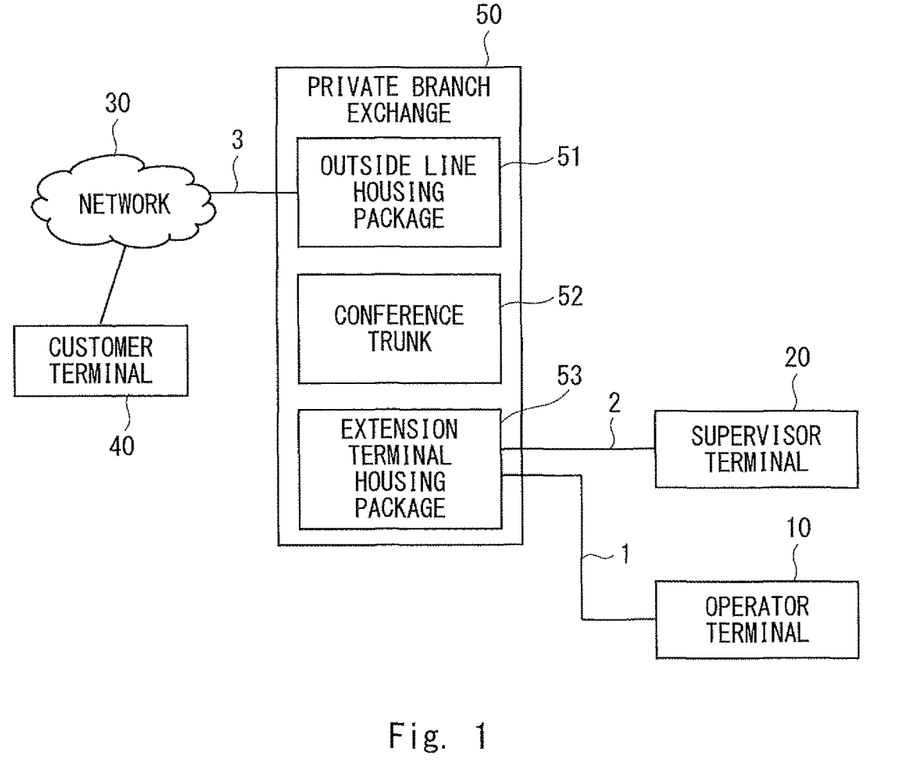
FIG. 1 is a system configuration diagram showing a configuration example of a call center telephone system according to the present invention.

A configuration example of a call center telephone system according to an embodiment of the present invention will be described in detail by referring to FIG. 1. FIG. 1 is a system configuration diagram showing a configuration example of the call center telephone system according to the present invention and shows a system configuration example of the call center telephone system including a private branch exchange that includes conference trunks for three-way calls.

The call center telephone system shown in FIG. 1 includes, in the private branch exchange 50, an outside line housing package 51 that houses an outside line 3 for connecting the call center telephone system to a network 30, conference trunks 52 for three-way call connections, and an extension terminal housing package 53. The extension terminal housing package 53 houses an operator terminal 10 and a supervisor terminal 20 that are arranged on an extension side via a first extension 1 and a second extension 2, respectively. A customer terminal 40 used by a customer who is attempting to use services of the call center telephone system via the network 30 is connected to the network 30.

Note that the private branch exchange 50 includes a switch network (not shown) inside. The private branch exchange 50 connects the outside line housing package 51 to the conference trunk 52 or to the extension terminal housing package 53 using the switch network. Likewise, the private branch exchange 50 can connect the conference trunk 52 to the outside line housing package 51 or to the extension terminal housing package 53 using the switch network.

Figure 2:
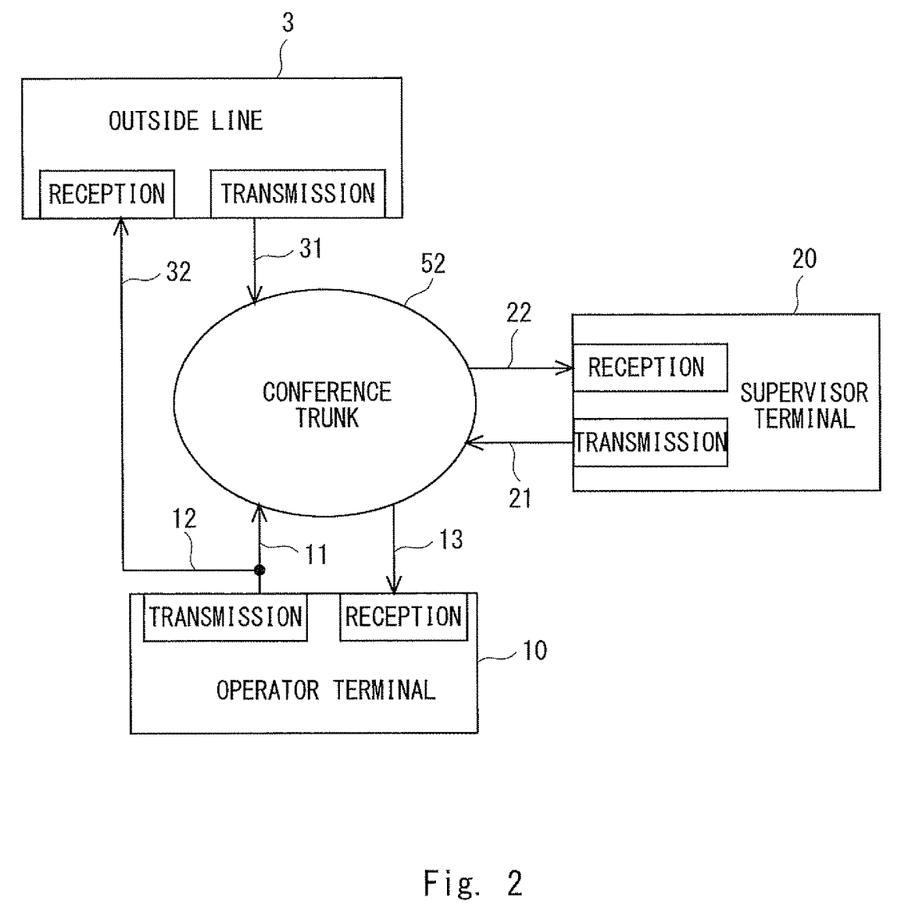
FIG. 2 is a connection configuration diagram showing an example of a connection configuration of the call center telephone system shown in FIG. 1.

Next, a connection configuration example of the call center telephone system shown in FIG. 1 will be described by referring to FIG. 2. FIG. 2 is a connection configuration diagram showing an example of a connection configuration of the call center telephone system shown in FIG. 1 and shows a connection state when a two-way call state, which is between a customer and an operator, is switched to a three-way call state in which a supervisor is included in the call. FIG. 2 shows an example of the three-way call connection state among the operator terminal 10 connected via the first extension 1, the supervisor terminal 20 connected via the second extension 2, and the customer terminal 40 connected via the outside line 3 and the network 30 using the conference trunk 52 inside the private branch exchange 50.

The first extension 1 to which the operator terminal 10 is connected includes a first transmission line 11, a second transmission line 12, and a reception line 13. The second transmission line 12 is branched from the first transmission line 11. The first transmission line 11 is used for a connection to the conference trunk 52, and the second transmission line 12 is used for a connection to the outside line 3 side. In the two-way call state between the customer and the operator, a reception line 32 of the outside line 3 to which the customer terminal 40 is connected via the network 30 is connected to the second transmission line 12. On the other hand, a transmission line 31 of the outside line 3 is connected to the reception line 13 of the operator terminal 10 to enable a two-way call between the customer and the operator.

In the two-way call state, for example, when the supervisor attempts to monitor the content of the call or to send a message, advice, or the like given to the operator who is on the phone with the customer, it is possible to switch the two-way call state, which is between the customer and the operator, to the three-way call state, which includes the privacy function that keeps the call between the operator and the supervisor private from the customer without putting the outside line 3 on the customer side on hold by pressing advice button included in the supervisor terminal 20. A connection configuration diagram of FIG. 2 shows a connection configuration example of the three-way call state that has been switched in the manner described above.

In the connection configuration example of the call center telephone system shown in FIG. 2, as described above, in regard to the first extension 1 to which the operator terminal 10 is connected, two branched transmission lines, which are: the first transmission line 11 for an extension connection to the conference trunk 52 for a three-way call connection; and the second transmission line 12 for an outside line connection to the outside line 3, are included as call lines on the transmission side connected to the mouthpiece (the microphone) of the operator terminal 10, and one reception line 13 is included as a call line on the reception side connected to the earpiece (the speaker or earphone) of the operator terminal 10.

In regard to the second extension 2 to which the supervisor terminal 20 is connected, one transmission line 21 is included as a call line on the transmission side connected to a mouthpiece (a microphone) of the supervisor terminal 20, and one reception line 22 is included as a call line on the reception side connected to an earpiece (a speaker or an earphone) of the supervisor terminal 20.

In regard to the outside line 3 to which the customer terminal 40 is connected via the network 30, one transmission line 31 is included as a call line on the transmission side to transmit a transmission voice from the customer terminal 40, and one reception line 32 is included as a call line on the reception side to transmit a reception voice to the customer terminal 40.

Note that the outside line housing package 51 and the extension terminal housing package 53 inside the private branch exchange 50 shown in FIG. 1 are not shown in the connection configuration diagram of FIG. 2.

In FIG. 2, for example, when the supervisor attempts to monitor the content of a call between the operator and the customer or attempts to send a message, advice, or the like given to the operator, and the supervisor presses the advice button included in the supervisor terminal 20, one of the available conference trunks 52 is captured. Then, as shown in the connection configuration diagram of FIG. 2, in the supervisor terminal 20 of the supervisor, both the transmission line 21, i.e., the call line on the transmission side, and the reception line 22, i.e., the call line on the reception side, are connected to the captured conference trunk 52 via the extension terminal housing package 53.

Additionally, a connection state of the transmission line 31 of the outside line 3, i.e., the call line on the transmission side, is switched from the connection to the reception line 13 of the operator terminal 10, i.e., the call line on the reception side, via the outside line housing package 51 to the connection to the conference trunk 52. Further, the connection of the reception line 32 of the outside line 3, i.e., the call line on the reception side, to the second transmission line 12 of the operator terminal 10 for an outside line connection via the outside line housing package 51 and the extension terminal housing package 53 remains as it is.

In regard to the operator terminal 10, a connection state of the reception line 13 of the operator terminal 10, i.e., the call line on the reception side, is switched from the connection to the transmission line 31 of the outside line 3 to which the customer terminal 40 is connected via the extension terminal housing package 53 and the outside line housing package 51 to the connection to the conference trunk 52 via the extension terminal housing package 53. Additionally, the connection of the second transmission line 12 of the operator terminal 10 for an outside line connection, i.e., the call line on the transmission side, to the reception line 32 of the outside line 3 via the extension terminal housing package 53 and the outside line housing package 51 remains as it is. On the other hand, the first transmission line 11 of the operator terminal 10 for an extension connection, i.e., the call line on the transmission side, is newly connected to the conference trunk 52 via the extension terminal housing package 53.

By the connection function inside the conference trunk 52, the first transmission line 11 of the operator terminal 10 is connected to both the reception line 13 of the operator terminal 10 and the reception line 22 of the supervisor terminal 20, while the transmission line 21 of the supervisor terminal 20 is connected only to the reception line 13 of the operator terminal 10. Further, the transmission line 31 of the outside line 3 is connected to both the reception line 13 of the operator terminal 10 and the reception line 22 of the supervisor terminal 20.

Therefore, the voice from the customer is output to both the operator at the operator terminal 10 and the supervisor at the supervisor terminal 20 via the transmission line 31 of the outside line 3, the conference trunk 52, and the reception lines 13 and 22. A voice from the operator at the operator terminal 10 is output to the supervisor at the supervisor terminal 20 via the first transmission line 11, the conference trunk 52, and the reception line 22 at the same time as it is output to the customer terminal 40 on the customer side via the second transmission line 12, the reception line 32 of the outside line 3, and the network 30. As a result, the supervisor at the supervisor terminal 20 can monitor the state of a call between the customer connected to the outside line 3 and the operator at the operator terminal 10.

Moreover, the voice from the supervisor at the supervisor terminal 20 is output only to the operator terminal 10 side via the transmission line 21, the conference trunk 52, and the reception line 13 and will not be output to the customer terminal 40 side connected to the outside line 3. In this way, even when the supervisor attempts to send advice, a message, or the like to the operator who is on the phone with the customer, the voice for the advice, the message, or the like uttered by the supervisor to the operator will be private from the customer side and can be transmitted only to the operator without letting the customer side hear the voice.

However, with the connection configuration of FIG. 2, the voice from the operator at the operator terminal 10 is output to the customer terminal 40 on the customer side via the second transmission line 12, the reception line 32 of the outside line 3, and the network 30 at the same time as it is transmitted to the supervisor at the supervisor terminal 20 via the first transmission line 11, the conference trunk 52, and the reception line 22. For this reason, when the operator receives the advice, the message, or the like uttered by the supervisor to the operator, he or she needs to listen to it silently without uttering any response, question, or the like to the supervisor or consulting with the supervisor.

Description of Operation of Embodiment

Figure 3:
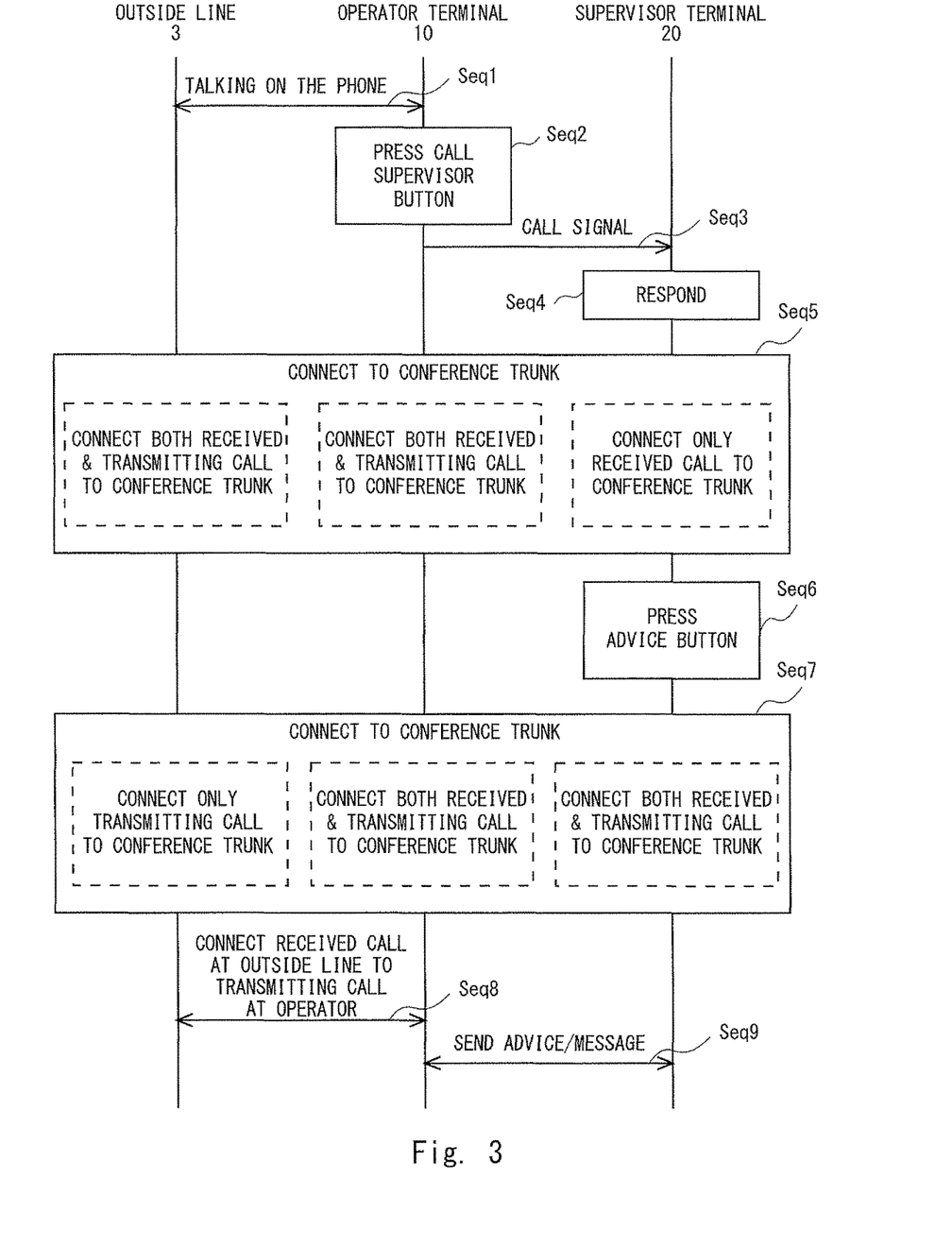
FIG. 3 is a sequence chart for describing an example of an operation of the call center telephone system shown in FIGS. 1 and 2.

Next, an example of an operation of the call center telephone system shown in FIGS. 1 and 2 will be described in detail with reference to a sequence chart of FIG. 3. FIG. 3 is the sequence chart for describing an example of the operation of the call center telephone system shown in FIGS. 1 and 2. FIG. 3 shows an example of operations of the outside line 3, the operator terminal 10, and the supervisor terminal 20 when the operator attempts to receive some sort of advice or the like from the supervisor while the operator at the operator terminal 10 is on the phone with the customer at the customer terminal 40 connected to the outside line 3 side.

To be more specific, the sequence chart of FIG. 3 shows an example of an operation where the operator asks the supervisor to monitor the content of a call between the operator dealing with the customer and the customer and then attempts to receive advice, a message, or the like from the supervisor based on a result of the monitoring. Thus, FIG. 3 does not show the abovementioned case in which the supervisor presses the advice button included in the supervisor terminal 20 in an attempt to monitor the content of a call between the operator and the customer or to send advice, a message, or the like to the operator.

The operations, which will be described by referring to the sequence chart of FIG. 3, are started from a state (sequence seq1) in which a two-way call state between the customer and the operator is continued between the outside line 3 to which the customer terminal 40 for the customer who is making an inquiry to the call center is connected and the operator terminal 10. In this state, the operator dealing with the customer presses a call supervisor button separately included in the operator terminal 10 in an attempt to receive, from the supervisor, advice, a message, or the like based on the content of a call between the operator and the customer (sequence seq2).

The private branch exchange 50 receives a press signal of the call supervisor button of the operator terminal 10 via the first extension 1, and transmits a call signal to the supervisor terminal 20 via the second extension 2 in order to call the supervisor (sequence Seq3). When the supervisor performs a response operation in response to the call signal (sequence Seq4), a response signal is returned to the private branch exchange 50 from the supervisor terminal 20 via the second extension 2.

When the private branch exchange 50 receives the response signal from the supervisor terminal 20, the private branch exchange 50 disconnects the connection of the reception line 32 of the outside line 3 to the second transmission line 12 of the operator terminal 10 and the connection of the transmission line 31 of the outside line 3 to the reception line 13 of the operator terminal 10, captures one of the available conference trunks 52, switches both of the connections of the reception line 32 and the transmission line 31 of the outside line 3 to be connected to the captured conference trunk 52 in order to switch both of the connections of the reception line 13 and the first transmission line 11 for an extension connection of the operator terminal 10, and further, only the reception line 22 of the supervisor terminal 20 is connected to the conference trunk 52, thereby establishing a two-way call content monitoring state (sequence Seq5).

In such a two-way call content monitoring state, as the content of a call between the customer and the operator is output from the reception line 22 of the supervisor terminal 20 via the conference trunk 52, the supervisor can monitor the content of the call.

After that, when the supervisor determines advice or a message to be sent to the operator based on the result of the monitoring of the content of the call between the customer and the operator, the supervisor presses the advice button separately included in the supervisor terminal 20 (sequence Seq6).

When the private branch exchange 50 receives a press signal of the advice button in the supervisor terminal 20 via the second extension 2, the private branch exchange 50 switches the connection of the reception line 22 of the supervisor terminal 20 as well as the connection of the transmission line 21 to be connected to the captured conference trunk 52. Moreover, the private branch exchange 50 disconnects the connection of the reception line 32 of the outside line 3 that has been connected to the conference trunk 52 and switches the connection of the outside line 3 in such a way that only the connection line 31 is connected to the conference trunk 52 (sequence Seq7). Further, the reception line 32 of the outside line 3 that has been disconnected from the conference trunk 52 is newly connected to the second transmission line 12 of the operator terminal 10 for an outside line connection (sequence Seq8). Note that both of the connections of the reception line 13 and the first transmission line 11 for an extension connection of the operator terminal 10 to the conference trunk 52 remain as they are.

In such a three-way call connection state, the supervisor can send advice or a message based on a result of monitoring of the content of a call between a customer and an operator from the transmission line 21 of the supervisor terminal 20 to the operator terminal 10 via the conference trunk 52 and the reception line 13 of the operator 10 so that the advice or messages is sent to the operator without letting the customer hear it (sequence Seq9). That is, it is possible for the supervisor to transmit advice or a message only to the operator even when the operator is on the phone with a customer by using the privacy function that keeps the call private from the outside line 3 (the customer) side.

Further, as the customer terminal 40 connected to the outside line 3 will not be put on hold, the customer at the customer terminal 40 can transmit a voice for the operator to the reception line 13 of the operator terminal 10 via the conference trunk 52. In addition, the customer at the customer terminal 40 can receive a voice of the operator from the second transmission line 12 of the operator terminal 10 for an outside line connection, which has been newly connected in the sequence Seq8, via the reception line 32 of the outside line 3 without using the conference trunk 52.

Note that as the reception line 32 of the outside line 3 is connected to the second transmission line 12 of the operator terminal 10 in the sequence Seq8, a voice uttered by the operator is transmitted to the customer side via the outside line 3. This indicates that the voice uttered by the operator to the supervisor is transmitted also to the customer side. Accordingly, from the sequence Seq8 onward, it is necessary for the operator to silently listen to advice or a message from the supervisor without uttering any confirmation, inquiry, or the like a consultation in response to the advice or the message from the supervisor or consulting with the supervisor.

Configuration Example of Other Exemplary Embodiments

Figure 4:
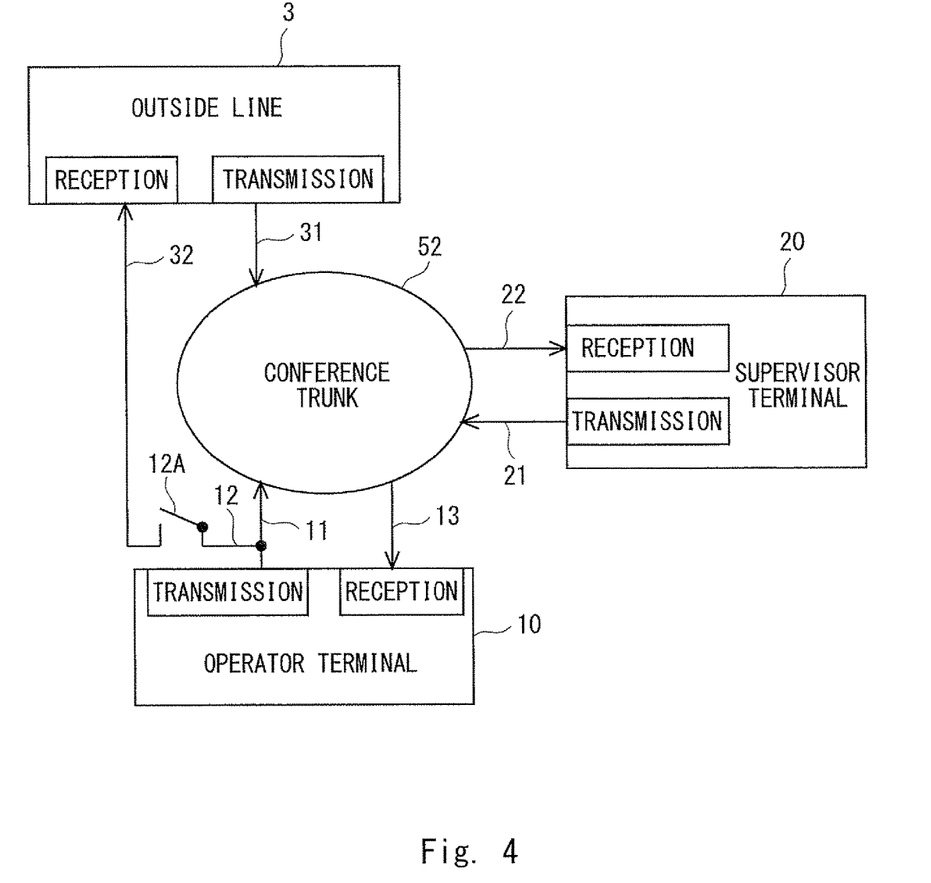
FIG. 4 is a connection configuration diagram showing another example of a connection configuration of the call center telephone system shown in FIG. 1.

In the call center telephone system shown in FIGS. 2 and 3, as described above, after the state is switched to the three-way call connection state via the conference trunk 52, a voice uttered by the operator is transmitted to the customer side at the customer terminal 40 from the second transmission line 12 of the operator terminal 10 via the outside line 3 at the same time as it is transmitted to the supervisor side at the supervisor terminal 20 from the first transmission line 11 of the operator terminal 10 via the conference trunk 52. For this reason, it is inconvenient for the operator that he or she needs to silently listen to advice or a message from the supervisor and is unable to utter any confirmation, inquiry, or the like to the supervisor or consult with the supervisor FIG. 4 is a connection configuration diagram showing another example of a connection configuration of the call center telephone system shown in FIG. 1. In the connection configuration example shown in FIG. 4, the above inconvenience in the configuration of FIG. 3 is overcome. In this connection configuration example, the operator can utter any confirmation, inquiry, or the like to the supervisor or consult with the supervisor to closely communicate with the supervisor instead of silently listening to advice or a message from the supervisor.

The only difference between the connection configuration example of the call center telephone system shown in FIG. 4 and the connection configuration example of the call center telephone system shown in FIG. 2 is in regard to the second transmission line 12 of the operator terminal 10 for an outside line connection. Other parts of the connection configuration example of the call center telephone system shown in FIG. 4 are completely the same as those of the connection configuration example of the call center telephone system shown in FIG. 2. In the call center telephone system shown in FIG. 4, the second transmission line 12 of the operator terminal 10 for an outside line connection further includes a switch 12A that can switch on and off a state of connection to the reception line 32 of the outside line 3 in addition to the components shown in the configuration example of FIG. 2. Thus, the second transmission line 12 is configured as a transmission line with a switch.

By employing such a transmission line with a switch, in the three-way call connection state using the conference trunk 52, it is possible to switch a state of connection of the two transmission lines (the first transmission line 11 and the second transmission line 12) of the operator terminal 10 between a state in which the two transmission lines are connected only to the conference trunk 52 (the switch 12A is off) and a state in which the two transmission lines are connected to both the conference trunk 52 and the outside line 3 (the switch 12A is on).

In the manner described above, when the operator attempts to transmit his or her voice to the outside line 3 side to which the customer terminal 40 is connected, the operator switches on the switch 12A so that the second transmission line 12 of the operator terminal 10 is connected to the reception line 32 of the outside line 3. Then, as the content of a call between the operator and the customer in such a connection state is output to the supervisor terminal 20 via the conference trunk 52 to which the first transmission line 11 of the operator terminal 10 and the transmission line 31 of the outside line 3 are connected, the supervisor can monitor the content of the call.

When the operator attempts to transmit his or her voice only to the supervisor at the supervisor terminal 20 without letting the voice flow to the outside line 3 side to which the customer terminal 40 is connected in order to, for example, consult with or make an inquiry to the supervisor, the operator may switch off the switch 12A and set the connection between the second transmission line 12 of the operator terminal 10 and the reception line 32 of the outside line 3 in an opened state. In such a connection state, a voice uttered by the operator will not leak to the customer side of the outside line 3 but instead output to the supervisor terminal 20 via the conference trunk 52 to which the first transmission line 11 of the operator terminal 10 is connected, thereby enabling the voice to be transmitted to the supervisor. In this case, as both the first transmission line 11 and the reception line 13 of the operator terminal 10 and both the transmission line 21 and the reception line 22 of the supervisor terminal 20 are connected to the conference trunk 52, the operator and the supervisor can closely communicate with each other. That is, the operator can consult with, make an inquiry to, or confirm something with the supervisor and the supervisor can give advice, an instruction, a message or the like to the operator without letting the customer hear them.

A case in which, after the call center telephone system receives an incoming call from the customer until the operator presses the call supervisor button included in the operator terminal 10, the two-way call state between the customer and the operator is configured by the connections of the transmission line 31 and the reception line 32 of the outside line 3 to the reception line 13 and the transmission line 12 for an outside line connection of the operator terminal 10, respectively, without using the conference trunk 52 has been explained.

However, the present invention is not limited to such a case. For example, if there are a sufficient number of conference trunks 52, in order to reduce the number of exchanging signals, the number of switching connections, and an amount of processing, when there is an incoming call from a customer to the call center telephone system, one of the available conference trunks may be immediately captured, and the two-way call state between the customer and the operator may be configured in such a way that the connections are established via the conference trunk 52. Specifically, the two-way call connection state may be configured in such a way that both the transmission line 31 and reception line 32 of the outside line 3 and both the first transmission line 11 and reception line 13 of the operator terminal 10 may be connected to the captured conference trunk.

Additionally, at least the reception line 22 of the supervisor terminal 20, together with the above call lines, may be connected to the captured conference trunk 52 to enable the supervisor to monitor the content of a call between the customer and the operator from the point at which the call is started.

Preferred embodiments of the present invention have been described so far. However, note that the embodiments are merely illustration of the present invention and do not limit the present invention in any way. Those skilled in the art would easily understand that various modifications and changes can be made according to particular usages without departing from the scope of the present invention.

The present application is based upon and claims the benefit of priority from Japanese Patent Application No. 2014-092475, filed on Apr. 28, 2014, the entire contents of which are hereby incorporated by reference.

REFERENCE SIGNS LIST

1 FIRST EXTENSION
2 SECOND EXTENSION

3 OUTSIDE LINE
10 OPERATOR TERMINAL
11 FIRST TRANSMISSION LINE
12 SECOND TRANSMISSION LINE
12A SWITCH
13 RECEPTION LINE
20 SUPERVISOR TERMINAL
21 TRANSMISSION LINE
22 RECEPTION LINE
30 NETWORK
31 TRANSMISSION LINE
32 RECEPTION LINE
40 CUSTOMER TERMINAL
50 PRIVATE BRANCH EXCHANGE
51 OUTSIDE LINE HOUSING PACKAGE
52 CONFERENCE TRUNK
53 EXTENSION TERMINAL HOUSING PACKAGE

The invention claimed is:

1. A call center telephone system receiving an inquiry from a customer at a customer terminal connected to an outside line of a private branch exchange to an operator at an operator terminal connected to an extension of the private branch exchange, the call center telephone system comprising:
   a supervisor terminal configured to be connected to an extension of the private branch exchange and used by the supervisor in order to provide advice or an instruction to the operator;
   the private branch exchange configured to achieve a three-way call connection state among the customer terminal on the outside line side, the operator terminal, and the supervisor terminal using conference trunks inside the private branch exchange, and configured to achieve a two-way call connection state between the customer terminal on the outside line side and the operator terminal; and
   the operator terminal comprising one reception line and two call lines including a first transmission line and a second transmission line,
   wherein when the private branch exchange switches the two-way call connection state between the customer terminal on the outside line side and the operator terminal to the three-way call connection state using the conference trunks, the private branch exchange captures one of the available conference trunks and connects a transmission line of the outside line, the reception line and the first transmission line of the operator terminal, and a transmission line and a reception line of the supervisor terminal, to the captured conference trunk, and also connects the second transmission line of the operator terminal to a reception line of the outside line,
   wherein the operator terminal further comprises a call supervisor button for the operator to call the supervisor, and the private branch exchange that has detected a press of the call supervisor button transmits a call signal to the supervisor terminal,
   wherein when the private branch exchange receives a response signal from the supervisor terminal that has received the call signal from the private branch exchange, the private branch exchange switches the two-way call connection state between the customer terminal on the outside line side and the operator terminal to a two-way call content monitoring state in which both the transmission line and the reception line of the outside line and both the first transmission line and the reception line of the operator terminal are connected to the captured conference trunk, and the reception line of the supervisor terminal is connected to the conference trunk, and
   wherein the supervisor terminal further comprises an advice button in order to provide the supervisor with a chance to send the advice or the instruction to the operator, and when the private branch exchange detects a press of the advice button, the private branch exchange disconnects the reception line of the outside line from the conference trunk, connects the reception line of the outside line to the second transmission line of the operator terminal, and connects the transmission line of the supervisor terminal to the conference trunk, to thereby switch the two-way call content monitoring state to the three-way call connection state.

2. The call center telephone system according to claim 1, wherein a switch capable of switching on and off a connection between the second transmission line of the operator terminal and the reception line of the outside line is configured to be connected to the second transmission line of the operator terminal.

3. A privacy call method in a call center telephone system receiving an inquiry from a customer at a customer terminal connected to an outside line of a private branch exchange to an operator at an operator terminal connected to an extension of the private branch exchange,
   wherein the privacy call method comprises:
      when the private branch exchange sets a three-way call connection state among the customer terminal on an outside line side, the operator terminal, and a supervisor terminal using conference trunks included in the private branch exchange,
      capturing one of the available conference trunks, and setting a three-way call connection state, in order to transmit a voice output from the supervisor terminal connected to the extension of the private branch exchange to the operator terminal without letting the voice flow to the outside line,
      wherein the three-way call connection state is a state in which a transmission line of the outside line, a first transmission line of the operator terminal, the first transmission line being one of two call lines included in the operator terminal, a reception line of the operator terminal, and a transmission line and a reception line of the supervisor terminal are connected to the captured conference trunk, and a second transmission line of the operator terminal is connected to a reception line of the outside line, the second transmission line being one of the two call lines included in the operator terminal, and
   wherein the privacy call method comprises:
      transmitting a call signal from the private branch exchange to the supervisor terminal, when the operator presses a call supervisor button included in the operator terminal in order to call the supervisor;
      switching, when the private branch exchange receives a response signal from the supervisor terminal that has received the call signal from the private branch exchange, the two-way call connection state between the customer terminal on the outside line side and the operator terminal to a two-way call content monitoring state in which both the transmission line and the reception line of the outside line and both the first transmission line and the reception line of the operator terminal are connected to the captured conference trunk, and the reception line of the supervisor terminal is connected to the conference trunk; and disconnecting the reception line of the outside line from the conference trunk, connecting the reception line of the outside line to the second transmission line of the operator terminal, and connecting the transmission line of the supervisor terminal to the conference trunk, to thereby switch the two-way call content monitoring state to the three-way call connection state, when the private branch exchange detects a press of an advice button included in the supervisor terminal in order to provide the supervisor with a chance to send the advice or the instruction to the operator.

4. The privacy call method according to claim 3, wherein on and off states of a switch connected to the second transmission line of the operator terminal are controlled in order to enable turning on and off a connection between the second transmission line of the operator terminal and the reception line of the outside line, so that a voice output from the operator terminal is transmitted to the supervisor terminal without letting the voice flow to the outside line side.

5. A non-transitory computer readable medium storing a program that causes a private branch exchange in a call center telephone system to execute operations, the call center telephone system receiving an inquiry from a customer at a customer terminal connected to an outside line of the private branch exchange to an operator at an operator terminal connected to an extension of the private branch exchange, wherein the operations comprise:

when the private branch exchange sets a three-way call connection state among the customer terminal on an outside line side, the operator terminal, and a supervisor terminal using conference trunks included in the private branch exchange, capturing one of the available conference trunks, and setting a three-way call connection state, in order to transmit a voice output from the supervisor terminal connected to the extension of the private branch exchange to the operator terminal without letting the voice flow to the outside line, wherein the three-way call connection state is a state in which a transmission line of the outside line, a first transmission line of the operator terminal, the first transmission line being one of two call lines included in the operator terminal, a reception line of the operator terminal, a transmission line of the supervisor terminal, and a reception line of the supervisor terminal are connected to the captured conference trunk, and a second transmission line of the operator terminal is connected to a reception line of the outside line, the second transmission line being one of the two call lines included in the operator terminal, and wherein the operations comprise:

transmitting a call signal from the private branch exchange to the supervisor terminal, when the operator presses a call supervisor button included in the operator terminal in order to call the supervisor;

switching, when the private branch exchange receives a response signal from the supervisor terminal that has received the call signal from the private branch exchange, the two-way call connection state between the customer terminal on the outside line side and the operator terminal to a two-way call content monitoring state in which both the transmission line and the reception line of the outside line and both the first transmission line and the reception line of the operator terminal are connected to the captured conference trunk, and the reception line of the supervisor terminal is connected to the conference trunk; and disconnecting the reception line of the outside line from the conference trunk, connecting the reception line of the outside line to the second transmission line of the operator terminal, and connecting the transmission line of the supervisor terminal to the conference trunk, to thereby switch the two-way call content monitoring state to the three-way call connection state, when the private branch exchange detects a press of an advice button included in the supervisor terminal in order to provide the supervisor with a chance to send the advice or the instruction to the operator.

\* \* \* \* \*